No. 854,213. PATENTED MAY 21, 1907.
J. E. HEALE.
TIRE PROTECTOR.
APPLICATION FILED DEC. 16, 1905. RENEWED MAR. 26, 1907.
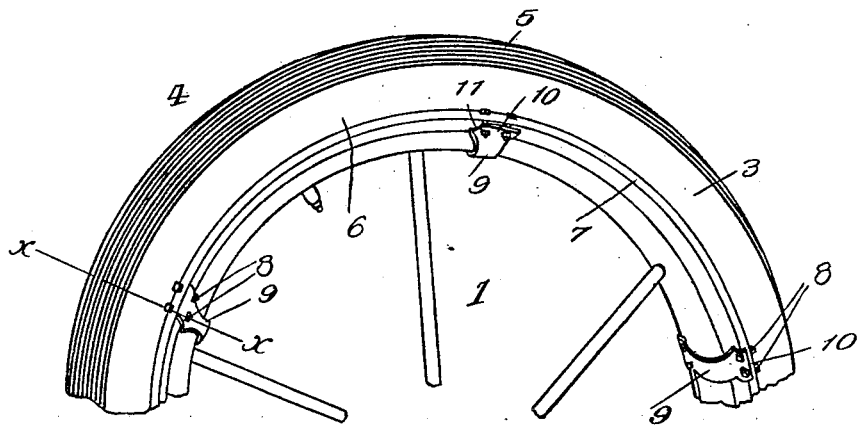
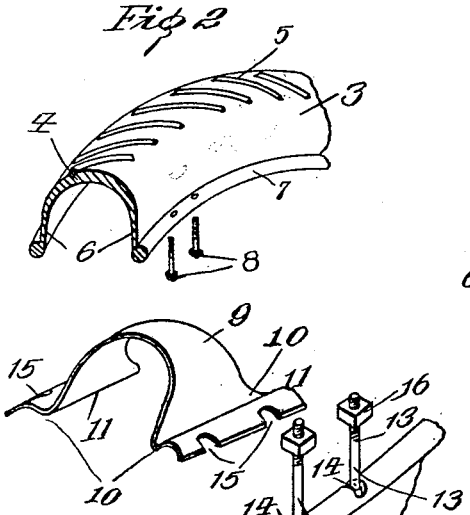
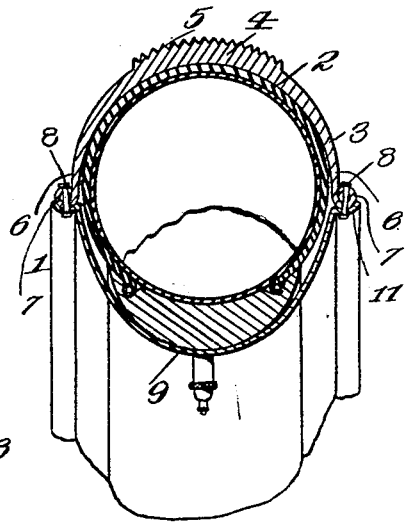
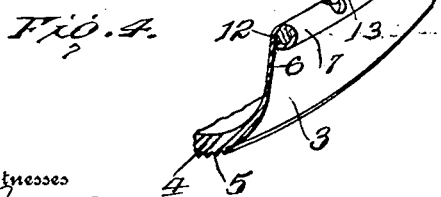
Witnesses
Inventor
J. E. Heale.

UNITED STATES PATENT OFFICE.

JAMES E. HEALE, OF ANACONDA, MONTANA.

TIRE-PROTECTOR.

No. 854,213.  Specification of Letters Patent.  Patented May 21, 1907.

Application filed December 16, 1905. Renewed March 26, 1907. Serial No. 364,645.

*To all whom it may concern:*

Be it known that I, JAMES E. HEALE, a citizen of the United States, residing at Anaconda, in the county of Deerlodge and State of Montana, have invented certain new and useful Improvements in Tire Protectors, of which the following is a specification.

This invention relates to an improved protector or shield for pneumatic tires and comprises essentially a guard member which is adapted to be secured upon the tread of the tire and which will effectively protect the tire from the cutting action of the sharp particles encountered upon the road.

The object of the invention is to provide a device of this character which can be easily and quickly applied to any tire, which can be manufactured at a comparatively small cost and which will prolong the life of the tire for an indefinite period.

For a full description of the invention and the merits thereof and also to acquire a knowledge of the details of construction of the means for effecting the result, reference is to be had to the following description and accompanying drawings, in which:

Figure 1 is a perspective view showing the application of the device; Fig. 2 is a perspective view of a portion of the guard member showing it as formed with transverse corrugations; Fig. 3 is a transverse sectional view; Fig. 4 is a detail perspective view showing a modification.

Corresponding and like parts are referred to in the following description and indicated in all the views of the drawings by the same reference characters.

The numeral 1 designates a wheel of any conventional type which is provided with a pneumatic tire 2. The guard member 3 is preferably formed of metal and fits around the tread or periphery of the tire 2, the sides of the guard being bent so as to embrace the tire. The base of the shield 3 is thickened at 4 and provided with corrugations 5 which may either run in a longitudinal direction as seen in Fig. 1, or in a transverse direction, as shown in Fig. 2. The latter form is specially adapted for use in the winter when the ground is frequently covered with snow. It will be apparent that when the wheel strikes the snow, the latter will be compressed and will form ribs which will engage with the transverse corrugations on the guard member 3 and prevent the wheel from slipping. The sides of the shield 3 are thin as seen at 6 so as to possess the necessary resiliency in order that the guard may give and conform to the shape of the tire 2 as the wheel revolves. The edges of the guard 3 are bent outwardly to form flanges in the nature of circular enlargements 7 which are provided at intervals with openings for the bolts 8 which are employed to secure the device in position. It will be observed that these flanges 7 are thickened to form a secure holding for the bolts and have a round formation. Securing clips 9 are employed to hold the shield 3 in position upon the tire. These clips 9 fit around the rim of the wheel and have their opposite ends broadened at 10 and bent outwardly to form flanges 11 which fit against the flanges 7 upon the guard member 3 and are provided with openings to receive the bolts 8. It will be observed that the bolts 8 are grouped in pairs and the ends of the clips 9 are broadened at 10 in order to form a sufficient bearing for the two bolts without unnecessarily increasing the width of the entire clip. Attention may also be called to the fact that the flanges 11 upon the clip 9 are bent so as to conform to the rounded shape of the flanges 7 upon the guard 3.

In order to place the guard member upon the tire, it is simply necessary to deflate the latter so that the shield 3 can be placed in position. The clips 9 can then be readily applied and the wheel is then ready for use as soon as the tire is inflated. A modification is shown in Fig. 4 which enables the guard member 3 to be removed from the tire or placed in position by simply loosening the nuts upon the bolts 8. In this view the circular enlargements 7 at the edges of the guard member 3 constitute bearings for the pintles 12. Threaded stems 13 project transversely from the pintles 12 and operate in slots 14 so that they can readily be swung either into or out of engagement with the clips 9. In this instance the flanges 11 upon the clips 9 are formed with slots 15 which receive the members 13. It will thus be seen that by simply loosening the nuts 16 upon the members 13, the latter can be swung outwardly and the entire device removed from the tire. This feature has the advantage of enabling quick access to be had to the tire for repairing or other purposes.

In manufacturing the protector it will be apparent that it may be either made from a single piece of material or from several pieces which are riveted or otherwise suitably fastened together so as to be smooth on the inside. This protector will prevent the rubber tire from spreading out upon the ground and will thus reduce the friction with the road and enable a greater speed to be attained. In applying the device to a wheel the tire is preferably inflated before the nuts are tightened so that it will be tightened evenly all around.

Having thus described the invention, what is claimed as new is:

1. In a device of the character described, the combination of a guard member fitting around the tread of the tire, the edges of the guard member being provided with outwardly extending flanges which are thickened and are in the nature of circular enlargements, securing clips fitting around the rim of the wheel, the ends of said securing clips being broadened and provided with outwardly extending flanges which fit against and are curved to conform to the shape of the before mentioned circular enlargements upon the guard member, and fastening members engaging with the flanges upon the securing clips and the circular enlargements.

2. In a device of the character described, the combination of a guard member fitting upon the tread of the tire, securing clips fitting around the frame of the wheel and having transverse slots formed in their opposite ends, spindles pivotally connected to the guard member and adapted to be swung into engagement with the before mentioned transverse slots in the securing clips, and nuts fitting upon the spindles and serving to clamp the members securely in position.

3. In a device of the character described, the combination of a guard member fitting upon the tread of a tire, the edges of said guard members being bent to form a bearing and provided with transverse slots, a pintle mounted in said bearing, threaded spindles connected to said pintle and operating in the slots, nuts coöperating with the threaded spindles, and securing clips fitting around the rim of the wheel and having slots in their opposite ends which are adapted to receive the threaded spindles.

In testimony whereof I affix my signature in presence of two witnesses.

JAMES E. HEALE. [L. S.]

Witnesses:
GEORGE O. ENGLISH,
TIMOTHY O'LEARY.